(12) United States Patent
Chen et al.

(10) Patent No.: US 12,199,481 B2
(45) Date of Patent: Jan. 14, 2025

(54) EXTERNALLY EXCITED ELECTRIC SYNCHRONOUS MACHINE

(71) Applicant: MAHLE International GmbH, Stuttgart (DE)

(72) Inventors: Guanqun Chen, Eberdingen (DE); Penyo Topalov, Stuttgart (DE); Philipp Zimmerschied, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/705,517

(22) PCT Filed: Oct. 20, 2022

(86) PCT No.: PCT/EP2022/079280
§ 371 (c)(1),
(2) Date: Apr. 26, 2024

(87) PCT Pub. No.: WO2023/072738
PCT Pub. Date: May 4, 2023

(65) Prior Publication Data
US 2024/0333115 A1    Oct. 3, 2024

(30) Foreign Application Priority Data

Oct. 27, 2021  (DE) ...................... 10 2021 212 146.2

(51) Int. Cl.
*H02K 19/36*   (2006.01)
*H01F 38/18*   (2006.01)
(Continued)

(52) U.S. Cl.
CPC ............. *H02K 19/36* (2013.01); *H01F 38/18* (2013.01); *H02K 11/0094* (2013.01);
(Continued)

(58) Field of Classification Search
CPC .. H02K 19/36; H02K 11/215; H02K 11/0094; H02K 11/042; H01F 38/18
See application file for complete search history.

(56) References Cited

U.S. PATENT DOCUMENTS 8,508,179 B2      8/2013  Schmidt
2011/0291605 A1 * 12/2011  Sakaguchi .............. H02P 6/181
                                                    318/709
(Continued)

FOREIGN PATENT DOCUMENTS

DE    102008032210 A1    1/2010
DE    102009014960 A1    10/2010
(Continued)

OTHER PUBLICATIONS

DE-102012006559-A1; Lasslop et al. all pages (Year: 2012).*
(Continued)

*Primary Examiner* — Naishadh N Desai
(74) *Attorney, Agent, or Firm* — Fishman Stewart PLLC (57) ABSTRACT

An externally excited electric synchronous machine may include a machine rotor, a machine stator, and a signal transmission device for contactless transmission of an operating signal corresponding to a DC voltage to the machine stator. The machine rotor may include a rotor shaft and a machine rotor coil. The machine rotor coil may be supplied with DC voltage and may provide a magnetic rotor field. The machine stator may include a machine stator coil that is fixed relative to the machine stator. The machine stator coil may provide a magnetic stator field, which may interact with the magnetic rotor field such that the machine rotor rotates. The signal transmission device may include (i) on the machine rotor, a signal coil connected in series with the machine rotor coil and (ii) on the machine stator, a magnetic field sensor that detects a magnetic field provided via the signal coil.

20 Claims, 4 Drawing Sheets

(51) Int. Cl.
  *H02K 11/00*   (2016.01)
  *H02K 11/042*  (2016.01)
  *H02K 11/215*  (2016.01)
  *H02K 19/26*   (2006.01)

(52) U.S. Cl.
  CPC ......... *H02K 11/042* (2013.01); *H02K 11/215* (2016.01); *H02K 19/26* (2013.01)

(56) References Cited

U.S. PATENT DOCUMENTS

2013/0207491 A1* 8/2013 Hatfield ................. H02K 3/522
                                                          310/71
2016/0211786 A1   7/2016 Rozman

FOREIGN PATENT DOCUMENTS

| DE | 102012006559 A1 * | 10/2013 | ............. H01F 38/18 |
| DE | 102017214766 A1 | 4/2018 | |
| DE | 102019217425 A1 | 5/2021 | |
| EP | 0359854 A1 | 3/1990 | |
| EP | 2869316 A1 | 5/2015 | |
| JP | 52120313 A | 10/1977 | |

OTHER PUBLICATIONS

English abstract for DE-102012006559.
English abstract for EP-0359854.
English abstract for DE-102017214766.
English abstract for DE-102009014960.
English abstract for DE-102019217425.
Machine translation of JP OA for JP2024-523861, dated Sep. 25, 2024.

* cited by examiner

EXTERNALLY EXCITED ELECTRIC SYNCHRONOUS MACHINE

CROSS-REFERENCE TO RELATED APPLICATIONS

This application claims priority to International Patent Application No. PCT/EP2022/079280, filed on Oct. 20, 2022, and German Patent Application No. DE 10 2021 212 146.2, filed on Oct. 27, 2021, the contents of both of which are hereby incorporated by reference in their entirety.

TECHNICAL FIELD

The present invention relates to an externally excited electric synchronous machine having a machine rotor coil, which during the operation is supplied with a DC voltage and generates a rotor field.

BACKGROUND

An externally excited electric synchronous machine comprises a fixed stator and a rotor rotating relative to the stator about an axis of rotation during the operation, which in the following are also referred to as machine stator and machine rotor. A magnetic rotor field of the machine rotor and a magnetic stator field of the machine stator act together. In the externally excited electric synchronous machine the required rotor field of the machine rotor is externally excited. For this purpose, the machine rotor generally comprises a rotor coil which is supplied with a DC voltage for generating the magnetic field. The supply of the rotor coil with the DC voltage usually takes place inductively.

Such a synchronous motor is known for example from EP 2 869 316 B1.

Usually, the fixed stator and the rotor rotating during the operation are matched to one another in such a manner that a desired operation of the synchronous motor materialises. Changes in the matching can thus result in deviation from the desired operation. Thus, desired changes during the operation can also be difficult to realise or not at all.

SUMMARY

The present invention therefore deals with the object of stating for an externally excited electric synchronous machine of the type mentioned at the outset and for a motor vehicle having such a synchronous machine improved or at least other embodiments, which eliminate disadvantages known from the prior art. In particular, the present invention deals with the object of stating for the externally excited electric synchronous machine and for the motor vehicle embodiments which are characterised by an increased operational stability and/or improved operating variability with simple implementation.

According to the invention, this object is achieved through the subject matter of the independent claim(s). Advantageous embodiments are the subject matter of the dependent claim(s).

Accordingly, the present invention is based on the general idea of tapping an electric current flowing through a rotor coil of a rotor of an externally excited electric synchronous machine by way of a signal coil connected in series thereto and generating by means of the signal coil magnetic field which is detected by a fixed sensor. Thus it is possible in a simple and effective manner to transmit an operating signal corresponding to the current flowing through the rotor coil from the rotor rotating during the operation to the fixed sensor in a contactless manner. As a consequence, changes in operating parameters of the synchronous machine, in particular in the current flowing through the rotor coil, can be taken into account in a simple and effective manner. This results in an increased operating stability of the synchronous machine. In addition, changes during the operation of the synchronous machine can be easily implemented in this manner. The result is an increased operating variability of the synchronous machine.

According to the inventive idea, the externally excited electric synchronous machine, in the following also referred to as synchronous machine in brief, comprises the rotor and a stator. In the following, the rotor is also referred to as machine rotor and the stator also as machine stator. The machine rotor comprises a rotor shaft on which the rotor coil is non-rotatably provided. In the following, the rotor coil is also referred to as machine rotor coil. The machine rotor coil generates a magnetic field during the operation, which in the following is also referred to as rotor field. For this purpose, the machine rotor coil is supplied with a DC voltage during the operation, so that the electric current, and thus a load current, flows through the machine rotor coil. The machine stator comprises a coil that is fixed to the machine stator, which in the following is also referred to as machine stator coil. The machine stator coil generates a magnetic field during the operation, which in the following is also referred to as stator field. During the operation, rotor field and stator field interact with one another in such a manner that the machine rotor rotates about an axial axis of rotation. The synchronous machine, further, comprises a signal transmission device for the contactless transmission of an operating signal corresponding to the DC voltage and thus the load current to the machine stator. The signal transmission device comprises on the machine rotor the signal coil connected in series with the machine rotor coil and on the machine stator a magnetic field sensor. The magnetic field sensor detects the magnetic field generated by the signal coil during the operation.

During the operation, the load current flows through the signal coil connected in series with the machine rotor coil. Thus, the signal coil generates a magnetic field which in the following is also referred to as signal field. The intensity of the signal field is dependent on the load current. In particular, the intensity of the signal field is proportional to the load current. The signal field detected by means of the magnetic field sensor is thus dependent on the load current, so that with the signal transmission device a contactless transmission of the signal field reflecting the load current as operating signal tales place from the machine rotor rotating during the operation to the fixed machine stator.

Basically, the magnetic field stator can be configured as desired provided it detects the signal field during the operation.

During the operation, the magnetic field sensor practically generates a sensor signal that is dependent on the detected signal field.

Preferred are embodiments, in which the magnetic field sensor is configured in such a manner that the sensor signal depends proportionally to the detected signal field. Thus, the sensor signal as a whole is proportionally dependent on the load current. This allows a simple and reliable determination of the load current.

In advantageous embodiments, the magnetic field sensor comprises a Hall effect sensor, also known as Hall sensor. Preferably, the magnetic field sensor is configured as a Hall effect sensor. Besides a simple configuration of the magnetic field sensor, there is thus an output of a sensor signal that is highly dependent on the signal field, in particular proportional to the signal field.

The directions stated here relate to the axially extending axis of rotation. Accordingly, "axial" extends parallel, in particular coaxially, to the axis of rotation. In addition, "radial" extends transversely to the axis of rotation. Further, the circumferential direction surrounds the axis of rotation.

Practically, the signal transmission device comprises a unit fixed to the machine stator for receiving and processing the sensor signal, which is practically electrically connected to the magnetic field sensor. The unit, which in the following is also referred to as processing unit, is practically configured in such a manner that it determines the load current from the sensor signal.

Basically, the signal coil can be attached to the machine rotor as desired.

Advantageously, the signal coil is attached to the rotor shaft.

Embodiments are considered advantageous in which the signal coil is arranged on an axial end-face of the rotor shaft. Thus, undesirable magnetic interactions of the signal coil with other magnetically active components of the synchronous machine are avoided or at least reduced. Further, this results in a compact design of the synchronous machine.

Basically, the signal coil can be configured as desired.

Preferably, the signal coil is configured as an air-core coil. Thus, an effect of the signal coil on the machine rotor coil is avoided or reduced as much as possible. Since the air-core coil has no magnetic saturation it is possible to generate the signal field over a wide range dependent, in particular proportionally, on the load current. This results in a reliable detection and determination of the load current.

Basically, the magnetic field sensor can be arranged relative to the signal coil as desired, provided that the magnetic field sensor detects the signal field.

It is conceivable to arrange the magnetic field sensor radially outside the signal coil.

Embodiments are considered preferable in which the magnetic field sensor axially enters the signal coil. The magnetic field sensor is thus surrounded in the circumferential direction by the signal coil. Thus, an improved and/or more accurate detection of the signal field occurs. In particular, interferences of the detection, for example noise, are thus prevented or at least reduced. Consequently the load current can thus be more easily and/or more reliably determined.

In preferred embodiments, the signal coil is surrounded in the circumferential direction by an axially open sleeve. The signal coil is inserted into the sleeve in particular axially. Practically, the sleeve is arranged on the side of the signal coil radially facing away from the magnetic field sensor. The sleeve serves in particular for the purpose of magnetic shielding. Thus, the signal field is not influenced by other magnetic fields or only as little as possible and vice versa. In addition, the signal coil is thus mechanically protected. Basically, the sleeve can be fixed to the machine stator.

Advantageously, the sleeve is non-rotatably arranged on the machine rotor, in particular on the rotor shaft. Preferably, the sleeve projects axially from the end-face of the rotor shaft and surrounds the signal coil, advantageously, further, the magnetic field sensor at least partially, in the circumferential direction.

Preferably, the machine rotor coil is supplied inductively. For this purpose, the synchronous machine preferably comprises an electric rotary transformer for the inductive energy transmission. The rotary transformer comprises a stator and a rotor, which in the following are also referred to as rotary transformer stator and rotary transformer rotor. The rotary transformer stator comprises a coil which in the following is also referred to as transformer primary coil. The rotary transformer rotor comprises a coil which in the following is also referred to as transformer secondary coil. The rotary transformer stator is fixed to the machine stator and the rotary transformer rotor is non-rotatably fixed to the machine rotor. The rotary transformer rotor is thus rotatable relative to the rotary transformer stator about the axis of rotation and co-rotates with the machine rotor about the axis of rotation during the operation. During the operation, the transformer primary coil and the transformer secondary coil inductively interact for inducing an AC voltage in the transformer secondary coil. The AC voltage is also referred to as transformer voltage in the following. Preferably, the transformer primary coil and the transformer secondary coil are arranged axially located opposite one another.

Between the transformer secondary coil and the machine rotor coil a rectifier circuit is practically connected. The rectifier circuit converts the transformer voltage induced in the transformer secondary coil during the operation in the DC voltage for the machine rotor coil. The rectifier circuit is configured accordingly.

Practically, the signal coil is separate from the transformer secondary coil.

Practically, the signal coil is preferably decoupled magnetically and/or shielded from the transformer secondary coil and the transformer primary coil.

Advantageously, the signal coil is spaced apart from the transformer secondary coil and from the transformer primary coil.

Preferably, the signal coil is radially, particularly preferably additionally axially spaced apart from the transformer secondary coil and/or from the transformer primary coil.

The synchronous machine can be electrically supplied by means of an electrical energy source, which provides a DC voltage.

Practically, the synchronous machine comprises a rectifier circuit connected upstream of the transformer primary coil. Thus, the AC voltage for the transformer primary coil required during the operation can originate from the energy source.

Analogous to this, the synchronous machine can comprise an inverter circuit, by means of which the machine stator coil is supplied with an AC voltage via the energy source.

Advantageously, the processing unit is communicatingly connected to a control device and/or at least one of the inverter circuits. Thus, the transformer voltage can be changed dependent on the load current. It is thus likewise possible to change the rotor field dependent on the load current.

The synchronous machine can basically be employed in any applications. In particular, the synchronous machine is employed as traction motor, for example in a motor vehicle. Preferably, such a traction motor has an output or drive power between 100 KW and 240 kW, in particular 140 KW.

The synchronous machine is employed in particular in a motor vehicle which can include a battery as electrical energy source for operating the synchronous machine. The synchronous machine serves in particular for driving the motor vehicle, is thus configured in particular as an externally excited electric synchronous motor.

It is to be understood that besides the externally excited electric synchronous machine the motor vehicle is also part of the scope of the present invention.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leave the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

An externally excited electric synchronous machine 100, in the following also referred to as synchronous machine 100 in brief, such as shown for example in the FIGS. 1 to 5, can be employed in a motor vehicle 200. The externally excited electric synchronous machine 100 can be employed as a synchronous motor 110 in particular for driving the motor vehicle 200.

Figure 1:
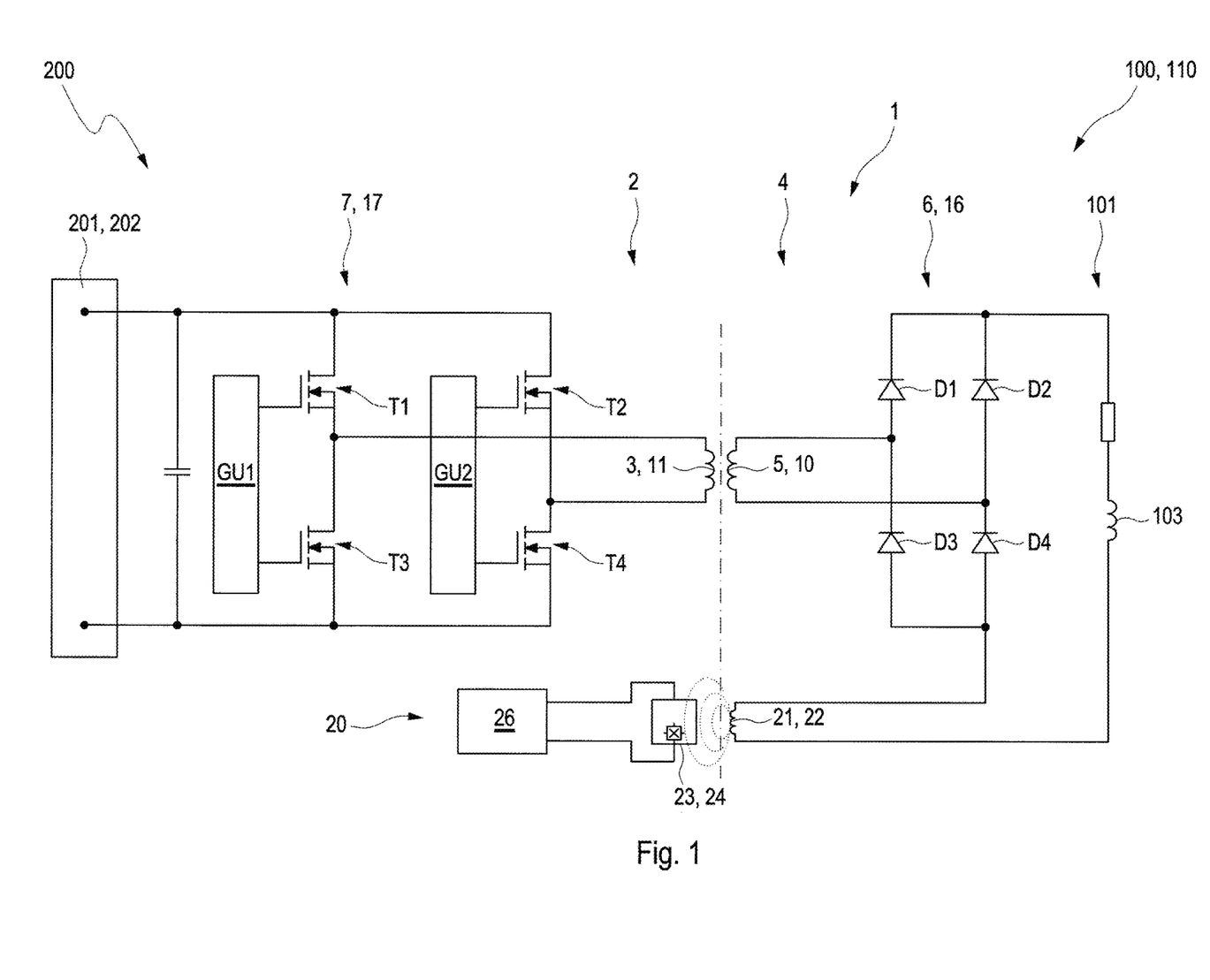
FIG. 1 shows a highly simplified circuit diagram of an externally excited electric synchronous machine with a signal transmission device in a motor vehicle.

As is evident in particular from FIG. 1, the synchronous machine 100 comprises a rotor 101. In the following, the rotor 101 is also referred to as machine rotor 101. The machine rotor 101 comprises a rotor shaft 102 and a coil 103 (see also FIG. 1) that is non-rotatably provided on the rotor shaft 102 (see FIGS. 2 to 5). The coil 103 is also referred to as machine rotor coil 103 in the following. During the operation, the machine rotor coil 103 generates a magnetic field which is also referred to as rotor field in the following. Further, the synchronous machine 100 comprises a stator 104 which is also referred to as machine stator 104 in the following. In addition, the synchronous machine 100 comprises a coil (105) (see FIG. 5) fixed to the machine stator, which is also referred to as machine stator coil 105 in the following. During the operation, the machine stator coil 105 generates a magnetic field which is also referred to as stator field in the following. Stator field and rotor field interact with one another in such a manner that the machine rotor 101 rotates about an axis of rotation 90 during the operation. For generating the rotor field, the machine rotor 101, in particular the machine rotor coil 103, requires a DC voltage. During the operation, an electric current flows through the machine rotor coil 103, which is also referred to as load current.

The directions stated here relate to the axis of rotation 90. Accordingly, "axial" extends parallel, in particular coaxially, to the axis of rotation. In addition, "radial" extends transversely to the axis of rotation 90. Further, the circumferential direction 91 extends surrounding the axis of rotation 90.

Figure 2:
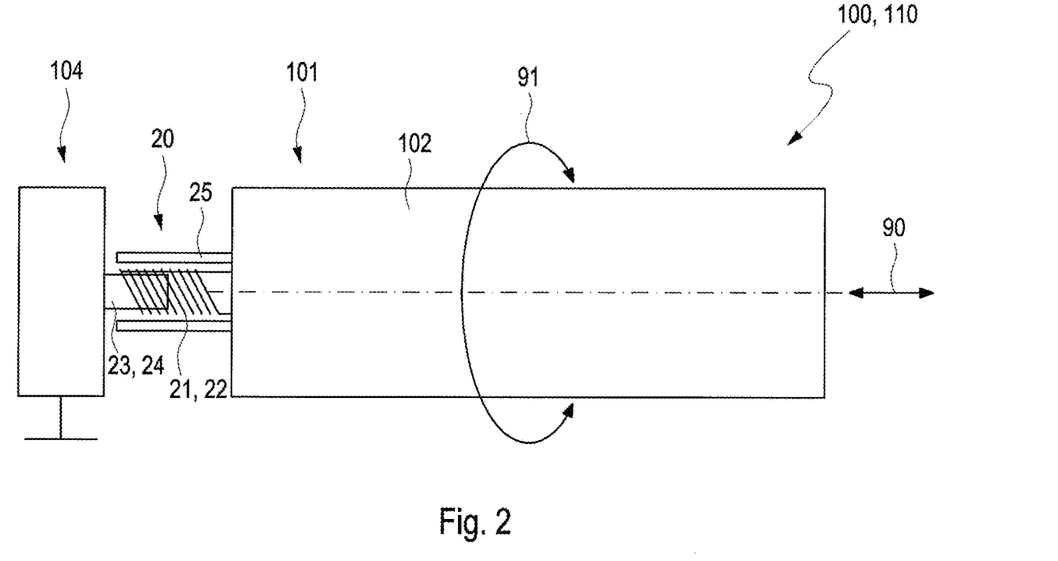
FIG. 2 shows a section through the synchronous machine in the region of the signal transmission device.

As is evident from FIGS. 1 and 2, the synchronous machine 100 comprises a signal transmission device 20 for the contactless transmission of an operating signal corresponding to the DC voltage to the machine stator 104. On the machine rotor 101, the signal transmission device 20 comprises a coil 21 connected in series with the machine rotor coil 103, which in the following is also referred to as signal coil 21. Thus, the signal coil 21 co-rotates with the machine rotor coil 103 about the axis of rotation 90 during the operation. Further, the signal transmission device 20 comprises a magnetic field sensor 23 on the machine stator 104. Thus, the signal coil 21 rotates relative to the magnetic field sensor 23 about the axis of rotation 90 during the operation. The magnetic field sensor 23 is configured in such a manner that it detects the magnetic field generated by the signal coil 21 and outputs a sensor signal that is dependent on the detected magnetic field. During the operation, the same current flows through the signal coil 21 connected in series with the machine rotor coil 103 as through the machine rotor coil 103. Thus, the load current flows through the signal coil 21. In the process, the signal coil 21 generates a magnetic field the intensity of which is proportional to the load current. The magnetic field generated by the signal coil 21 is also referred to as signal field in the following. By detecting the signal field, an operating signal corresponding to the load current and thus to the DC voltage is transmitted to the machine stator 104 in a contactless manner. In the shown exemplary embodiments, the signal coil 21 is configured as an air-core coil 22. In addition, the magnetic field sensor 23 in the shown exemplary embodiments is configured as a Hall effect sensor 24, also referred to as Hall sensor 24 in brief.

As is evident from the exemplary embodiment shown in FIG. 2, the signal coil 21 is arranged in the shown exemplary embodiment and preferably on an axial end-face of the rotor shaft 102. There, the magnetic field sensor 23 enters the signal coil 21 axially. The magnetic field sensor 23 is thus surrounded in the circumferential direction 91 by the signal coil 21. This results in a more reliable detection of the signal field and/or a reduction of noise signals in the magnetic field sensor 23.

As is evident from FIG. 2, the signal coil 21 is surrounded in the circumferential direction 91 by an axially open sleeve 25. Thus, the sleeve 25 is arranged on the side of the signal coil 21 which radially faces away from the magnetic field sensor 23. In the shown exemplary embodiment, the sleeve 25 is non-rotatably attached to the rotor shaft 102. The sleeve 25 serves in particular for the magnetic shielding.

Figure 3:
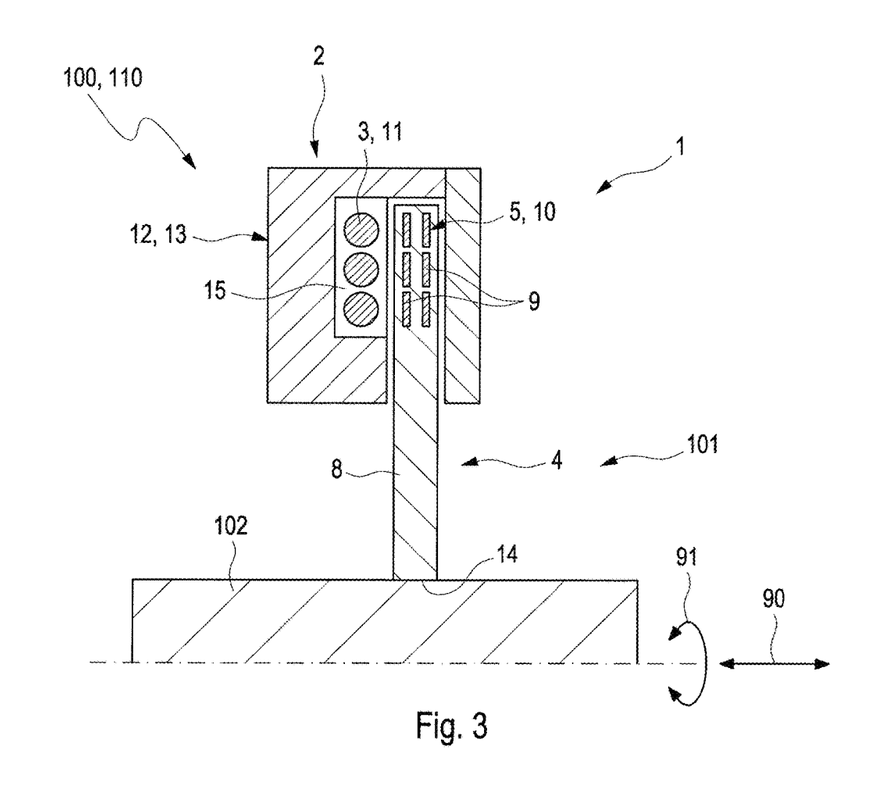
FIG. 3 shows a section through a rotary transformer of the synchronous machine.
Figure 4:
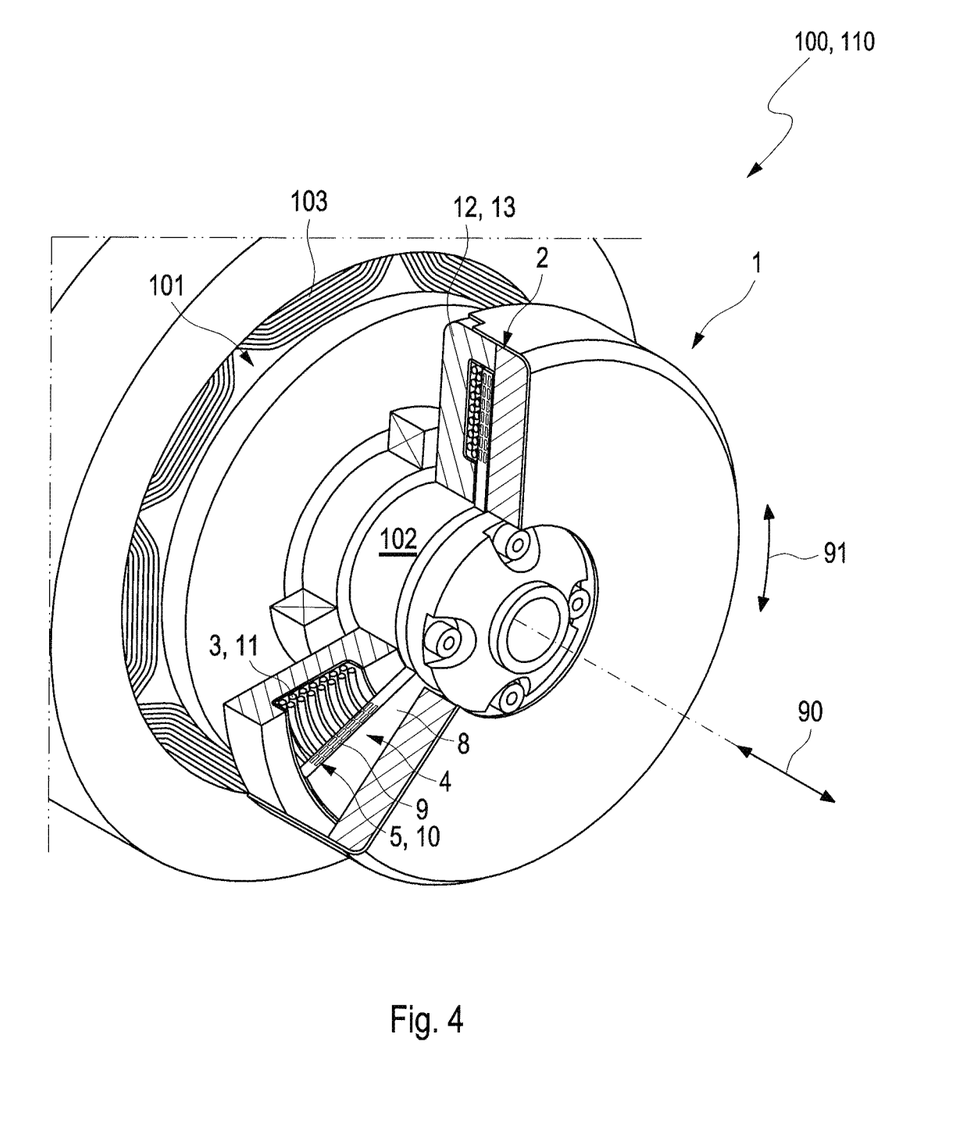
FIG. 4 shows an isometric partially sectioned view of the externally excited electric synchronous machine.
Figure 5:
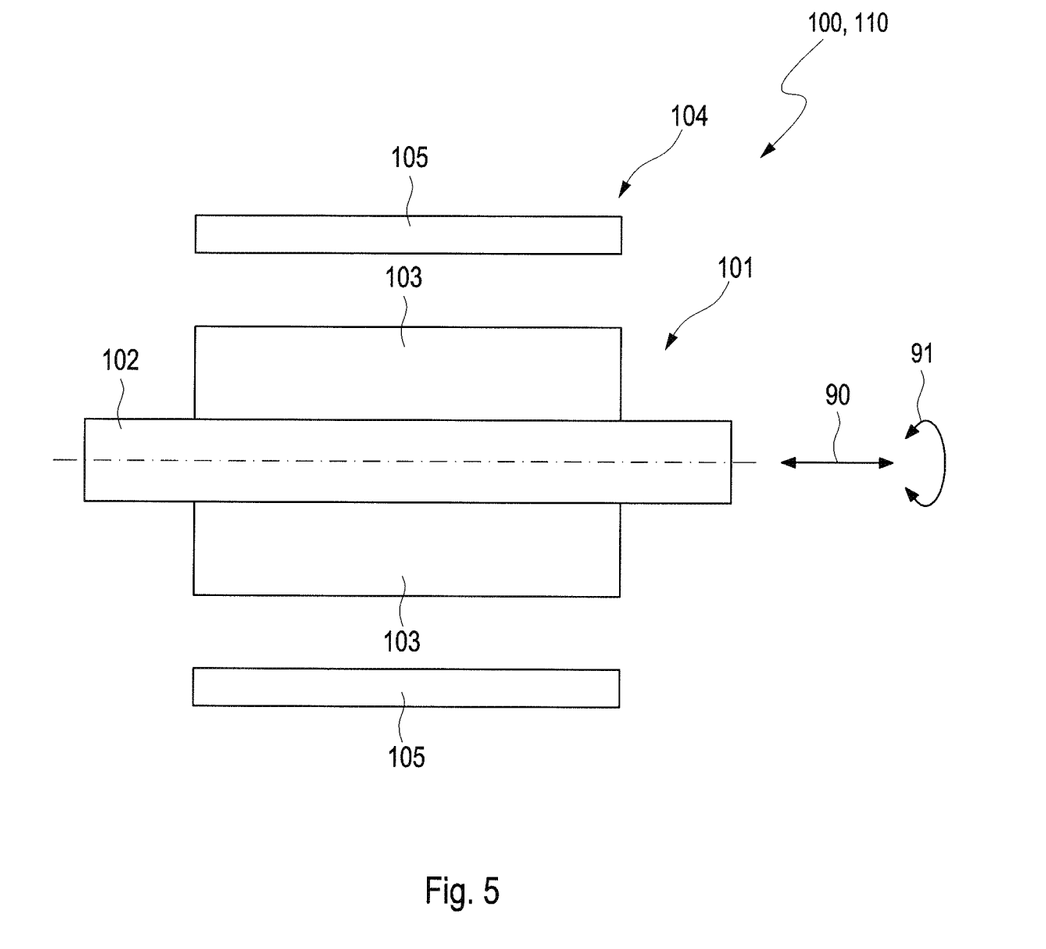
FIG. 5 shows a highly simplified section through the externally excited electric synchronous machine.

In the shown exemplary embodiments, the supply of the machine rotor coil 103 with a DC voltage takes place inductively with an electric rotary transformer 1 for the inductive energy transmission shown in the FIGS. 1, 3 and 4. The rotary transformer 1 comprises a stator 2 and a rotor 4. The stator 2 is referred to as rotary transformer stator 2 in the following. The rotor 4 is referred to as rotary transformer rotor 4 in the following. The rotary transformer rotor 4 is non-rotatable relative to the machine rotor 101. The rotary transformer stator 2 is fixed relative to the machine stator 104. Thus, the rotary transformer rotor 4 co-rotates with the machine rotor 101 relative to the rotary transformer stator 2 about the axis of rotation 90 during the operation. For the inductive energy transmission, the rotary transformer stator 2 comprises a primary coil 3 and the rotary transformer rotor 4 a secondary coil 5. The primary coil 3 and the secondary coil 5 are arranged, as is evident from the FIGS. 3 and 4, located axially opposite one another in the shown exemplary embodiments. During the operation, the primary coil 3, which is also referred to as transformer primary coil 3 in the following, induces an AC voltage, which is also referred to as transformer voltage in the following, in the secondary coil 5, which is also referred to as transformer secondary coil 5 in the following. The signal transmission device 20 can be part of the rotary transformer 1. In order to supply the machine rotor coil 103 with the required DC voltage, as is evident from FIG. 1, a rectifier circuit 6 that is non-rotatable relative to the machine rotor 101 is connected between the transformer secondary coil 5 and the machine rotor 103, which rectifier circuit 6 converts the transformer voltage into the DC voltage. In the exemplary embodiment shown in FIG. 1, the rectifier circuit 6 is purely exemplarily configured as a bridge rectifier 16 with four diodes D1-4.

Practically, the signal coil 21 and the transformer secondary coil 5 are preferably magnetically separated from one another. For this purpose, the signal coil 21 and the transformer secondary coil 5 are radially spaced apart from one another.

For inducing the transformer voltage in the transformer secondary coil 5, the transformer primary coil 3 requires an AC voltage. As is evident from FIG. 1, the transformer primary coil 3 in the shown exemplary embodiments is supplied via an electrical energy source 201, which provides a DC voltage. The energy source 201 in the shown exemplary embodiments is a battery 202 of the motor vehicle 200. For supplying the transformer primary coil 3 with the AC voltage, an inverter circuit 7 is provided between the energy source 201 and the transformer primary coil 3. The inverter circuit 7 converts the DC voltage of the energy source 201 into the AC voltage for the transformer primary coil 3. It is conceivable that the inverter circuit 7 comprises a converter. The machine stator coil 105 can be electrically supplied in the same manner (not shown). In the shown exemplary embodiment, the inverter circuit 7 is purely exemplarily configured as a sine wave inverter 17, which comprises four transistors T1-4 and two controls GU1, GU2.

In the shown exemplary embodiments, as is evident from FIG. 1, the signal transmission device 20 comprises a unit 26 fixed relative to the machine stator 104, which is electrically connected to the magnetic field sensor 23 and receives and processes the sensor signal generated by the magnetic field sensor 23. The unit 26 is also referred to as processing unit 26 in the following. With the processing unit 26, the operation of the synchronous motor 100, in particular of the rotary transformer 1, can be adapted and/or changed dependent on the load current of the machine rotor coil 103. For the purpose, the inverter circuit 7 can be communicatingly connected to at least one of the controls GU1, GU2 (not shown).

As is evident from the FIGS. 3 and 4, the rotary transformer rotor 4 in the shown exemplary embodiments comprises a circuit board 8, which is provided with the transformer secondary coil 5. The circuit board 8 is configured disc-like and has a round shape, i.e. is configured in the manner of a round disc or of a ring. The transformer secondary coil 5 in the shown exemplary embodiments comprises at least one trace 9 of the circuit board 8, which in the following is also referred to as transformer trace 9. In the shown exemplary embodiments, the transformer secondary coil 5 consists of the at least one transformer trace 9 and is configured as a planar winding 10. As is evident from FIG. 3, the circuit board 8 can comprise two transformer traces 9 that are axially spaced apart from one another, which helically surround the axis of rotation 90. In the shown exemplary embodiments, the at least one transformer trace 9 is entirely arranged in the circuit board 8. The non-rotatable connection of the rotor shaft 102 with the rotary transformer rotor 4 is realised in the shown exemplary embodiments, as is evident from the FIGS. 3 and 4, via a central opening 14 in the circuit board 8, through which the rotor shaft 102 engages.

As is evident in particular from the FIGS. 3 and 4, the transformer primary coil 3 in the shown exemplary embodiments is configured as a flat coil 11. The transformer primary coil 3 and the transformer secondary coil 5 are arranged in the shown exemplary embodiments in a magnetic core 12, in particular a ferrite core 13 that is fixed relative to the rotary transformer stator 2. In the following, the magnetic core 12 is also referred to as transformer magnetic core 12. The transformer magnetic core 12 is radially open, so that the circuit board 8 with the transformer secondary coil 5 enters the transformer magnetic core 12 and is arranged so as to be rotatable therein. In addition, the transformer magnetic core 12 comprises an axially open recess 15, in which the transformer primary coil 3 is arranged.

The invention claimed is:

1. An externally excited electric synchronous machine, comprising:
   a machine rotor including a rotor shaft and a machine rotor coil that is non-rotatably arranged on the rotor shaft, the machine rotor coil supplied with DC voltage during operation and providing a magnetic rotor field;
   a machine stator including a machine stator coil that is fixed relative to the machine stator, the machine stator coil providing a magnetic stator field during operation, the magnetic stator field interacting with the magnetic rotor field such that the machine rotor rotates about an axial axis of rotation during operation;
   a signal transmission device for contactless transmission of an operating signal corresponding to the DC voltage to the machine stator; and
   wherein the signal transmission device includes (i) on the machine rotor, a signal coil connected in series with the machine rotor coil and (ii) on the machine stator, a magnetic field sensor that detects a magnetic field provided via the signal coil during operation.

2. The synchronous machine according to claim 1, wherein the signal coil is arranged on an axial end-face of the rotor shaft.

3. The synchronous machine according to claim 1, wherein the signal coil is configured as an air-core coil.

4. The synchronous machine according to claim 1, wherein the magnetic field sensor axially extends into the signal coil.

5. The synchronous machine according to claim 1, wherein the signal coil is surrounded in a circumferential direction by an axially open sleeve.

6. The synchronous machine according to claim 5, wherein the sleeve is non-rotatably attached to the machine rotor.

7. The synchronous machine according to claim 1, further comprising an electric rotary transformer for inductive energy transmission, wherein:
   the rotary transformer includes:
   a rotary transformer stator including a transformer primary coil that is fixed relative to the machine stator; and
   a rotary transformer rotor including a transformer secondary coil that is non-rotatably fixed relative to the machine rotor such that the rotary transformer rotor rotates relative to the rotary transformer stator about the axis of rotation during operation;

the transformer secondary coil and the transformer primary coil inductively interacts with one another to provide a transformer voltage in the transformer secondary coil during operation; and the machine rotor coil is connected to the transformer secondary coil such that the machine rotor coil is supplied with the DC voltage for providing the magnetic rotor field.

8. The synchronous machine according to claim 7, wherein the signal coil and the transformer secondary coil are arranged radially spaced apart from one another.

9. The synchronous machine according to claim 7, further comprising a rectifier circuit connected between the transformer secondary coil and the machine rotor coil, wherein the rectifier circuit is configured to convert the transformer voltage into the DC voltage.

10. The synchronous machine according to claim 7, wherein the transformer primary coil and the transformer secondary coil are arranged axially opposite one another.

11. The synchronous machine according to claim 1, wherein the magnetic field sensor includes a Hall effect sensor.

12. A rotary transformer according to claim 1, wherein the signal transmission device includes a processing unit that is fixed relative to the rotary transformer stator, the processing unit electrically connected to the magnetic field sensor for receiving a sensor signal provided via the magnetic field sensor.

13. A motor vehicle, comprising:
a synchronous machine according to claim 7; and
an electrical energy source;
wherein the energy source is connected via an inverter circuit to the transformer primary coil.

14. The synchronous machine according to claim 5, wherein the sleeve is non-rotatably attached to the rotor shaft.

15. An externally excited electric synchronous machine, comprising:
a machine rotor including a rotor shaft and a machine rotor coil that is non-rotatably arranged on the rotor shaft, the machine rotor coil supplied with DC voltage during operation and providing a magnetic rotor field;
a machine stator including a machine stator coil that is fixed relative to the machine stator, the machine stator coil providing a magnetic stator field during operation, the magnetic stator field interacting with the magnetic rotor field such that the machine rotor rotates about an axial axis of rotation during operation;

a signal transmission device for contactless transmission of an operating signal corresponding to the DC voltage to the machine stator;

wherein the signal transmission device includes (i) on the machine rotor, a signal coil connected in series with the machine rotor coil and (ii) on the machine stator, a magnetic field sensor that detects a magnetic field provided via the signal coil during operation;

wherein the signal coil is arranged on an axial end-face of the rotor shaft; and wherein the magnetic field sensor extends axially into the signal coil.

16. The synchronous machine according to claim 15, further comprising an electric rotary transformer for inductive energy transmission, wherein:
the rotary transformer includes:
a rotary transformer stator including a transformer primary coil that is fixed relative to the machine stator; and
a rotary transformer rotor including a transformer secondary coil that is non-rotatably fixed relative to the machine rotor such that the rotary transformer rotor rotates relative to the rotary transformer stator about the axis of rotation during operation;
the transformer secondary coil and the transformer primary coil inductively interact with one another to provide a transformer voltage in the transformer secondary coil during operation; and
the machine rotor coil is connected to the transformer secondary coil such that the machine rotor coil is supplied with the DC voltage for providing the magnetic rotor field.

17. The synchronous machine according to claim 16, wherein the signal coil and the transformer secondary coil are arranged radially spaced apart from one another.

18. The synchronous machine according to claim 16, further comprising a rectifier circuit connected between the transformer secondary coil and the machine rotor coil, wherein the rectifier circuit is configured to convert the transformer voltage into the DC voltage.

19. The synchronous machine according to claim 16, wherein the transformer primary coil and the transformer secondary coil are arranged axially opposite one another.

20. A rotary transformer according to claim 15, wherein the signal transmission device includes a processing unit that is fixed relative to the rotary transformer stator, the processing unit electrically connected to the magnetic field sensor for receiving a sensor signal provided via the magnetic field sensor.

* * * * *